(12) United States Patent
Hayes et al.

(10) Patent No.: US 11,878,789 B2
(45) Date of Patent: Jan. 23, 2024

(54) AIRCRAFT BRAKE CONTROL SYSTEM

(71) Applicant: Airbus Operations Limited, Bristol (GB)

(72) Inventors: Alexander Hayes, Bristol (GB); Ashley Bidmead, Bristol (GB); Andrew Hebborn, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 4 days.

(21) Appl. No.: 17/688,643

(22) Filed: Mar. 7, 2022

(65) Prior Publication Data
US 2022/0281590 A1 Sep. 8, 2022

(30) Foreign Application Priority Data
Mar. 8, 2021 (GB) ...................... 2103175

(51) Int. Cl.
B64C 25/46 (2006.01)
B60T 8/17 (2006.01)
B64C 25/42 (2006.01)

(52) U.S. Cl.
CPC ............ B64C 25/46 (2013.01); B60T 8/1703 (2013.01); B64C 25/426 (2013.01)

(58) Field of Classification Search
CPC ...... B64C 25/46; B64C 25/426; B60T 8/1703
See application file for complete search history.

(56) References Cited

U.S. PATENT DOCUMENTS

| 6,088,646 A | 7/2000 | Wiel | |
|---|---|---|---|
| 2007/0069071 A1* | 3/2007 | Near | B64D 39/00 244/99.2 |
| 2008/0154443 A1 | 6/2008 | Godo | |
| 2008/0284358 A1 | 11/2008 | Ralea | |
| 2011/0040466 A1* | 2/2011 | Hill | B60T 8/885 701/74 |
| 2016/0009385 A1* | 1/2016 | Van Deventer | B60T 8/17613 701/71 |
| 2017/0110997 A1 | 4/2017 | Krucinski et al. | |
| 2017/0174331 A1* | 6/2017 | Georgin | B60T 8/885 |
| 2018/0015910 A1 | 1/2018 | Georgin | |
| 2019/0322253 A1* | 10/2019 | Arsenault | B64C 25/44 |
| 2020/0407049 A1* | 12/2020 | Forghani | B60T 8/1703 |

OTHER PUBLICATIONS

Combined Search and Examination Report for Application No. GB 2103175.2 dated Aug. 20, 2021, 8 pages.
Search and Examination Report for Application No. GB 2103175.2 dated Jan. 12, 2022, 8 pages.
Extended European Search Report for Application No. EP 22160608.0, eight pages, dated Jun. 23, 2022.

\* cited by examiner

*Primary Examiner* — Justin M Benedik
(74) *Attorney, Agent, or Firm* — Nixon & Vanderhye P.C.

(57) ABSTRACT

An aircraft brake control system for controlling antiskid braking of an aircraft wheel is disclosed including a control assembly having a mode controller which sets the mode of operation of an antiskid brake calculator, configured to set a first mode, when an input of the indication of a brake energy supply configuration indicates a first brake energy supply being used, in which the antiskid brake calculator applies a first restriction level on a rise rate of the antiskid brake command, and a second mode, when the input 305 indicates a second brake energy supply being used, in which the antiskid brake calculator applies a second, lower, restriction level on a rise rate of the antiskid brake command.

7 Claims, 4 Drawing Sheets

AIRCRAFT BRAKE CONTROL SYSTEM

CROSS RELATED APPLICATION

This application claims priority to United Kingdom Patent Application GB 2103175.2, filed on Mar. 8, 2021, the entire contents of which is hereby incorporated by reference.

BACKGROUND OF THE INVENTION

The present disclosure relates to an aircraft brake control system.

The present invention concerns aircraft brake control systems. More particularly, but not exclusively, this invention concerns an aircraft brake control system for controlling antiskid braking of a wheel of an aircraft, the system comprising a control assembly having an input of an indication of a wheel speed of the wheel, an input of an indication of a brake level (either a desired/commanded brake level or an actual brake level), an antiskid brake calculator, for calculating an antiskid brake command based on the wheel speed and brake level, and an output for indicating the antiskid brake command to be sent to a brake valve.

The invention also concerns other aircraft brake control systems, aircraft landing gear, aircraft and methods of braking an aircraft.

Conventional antiskid systems reduce the level of brake command to unlock a skidding wheel by reducing the brake force/torque it experiences. Hence, the braking performance is temporarily reduced in order to unlock the skidding wheel, and so improve braking performance overall. This also prevents the skidded wheel from bursting due to being in a prolonged skid.

US 2020/0407049 describes an antiskid braking system that can be employed when in a backup mode, i.e. when the hydraulic braking fluid available to be used for braking is finite. Here, the reduction in braking command due to antiskid is more than what it would be normally. In the braking system described, the reduction in command is based on a slip error factor (from comparing the dynamic slip of a plurality of wheels and a target slip value).

However, this system does not consider what the wheel may be actually doing (for example, slipping, skidding or something else). It also does not consider that a fixed target slip value may not be appropriate in the current situation (for example, the target slip value may be determined for a dry runway and/or a cool day but a wet runway or hotter day would affect where the target slip value (where the coefficient of friction is at a maximum) should be.

Hence, this may lead to more or less antiskid braking command being applied, than is ideal.

Further, the antiskid system does not consider how to prevent skids in the first place (only unlock skids when they occur), or how to further prevent hydraulic fluid loss from the system.

FIG. 1 is a schematic view of a different antiskid brake control system. Here, a wheel speed, and other factors taken into consideration by an optimisation controller, are used to calculate an antiskid brake current, which is subtracted from a command current, to provide a brake servo valve current. This servo valve current is used to control the hydraulic brake pressure applied to the wheel.

The present invention seeks to mitigate the above-mentioned problems. Alternatively or additionally, the present invention seeks to provide an improved aircraft brake control system.

SUMMARY OF THE INVENTION

The present invention provides, according to a first aspect, an aircraft brake control system for controlling antiskid braking of a wheel of an aircraft, the system comprising a control assembly having an input of an indication of a wheel speed of the wheel, an input of an indication of a brake level, an input of an indication of a brake energy supply configuration, an antiskid brake calculator, for calculating an antiskid brake (current) command based on the wheel speed and brake level, a mode controller which sets the mode of operation of the antiskid brake calculator, the mode controller configured to set a first mode, when the input of the indication of a brake energy supply configuration indicates a first brake energy supply being used, in which the antiskid brake calculator applies a first restriction level on a rise rate of the antiskid brake (current) command, and a second mode, when the input of the indication of a brake energy supply configuration indicates a second brake energy supply being used, in which the antiskid brake calculator applies a second restriction level on a rise rate of the antiskid brake (current) command, the second restriction level being lower than the first restriction level, and an output for indicating the antiskid brake (current) command to be sent to a brake valve.

Such a system allows for a greater restriction on the rise rate of the brake command (current) when in a second, for example, an emergency or secondary energy supply configuration. This reduces the brake efficiency (because it would take longer to increase the brake torque) but is more likely to prevent a skid occurring (that might otherwise occur due to too aggressive re-braking after a skid has been unlocked). Hence, it reduces the need to release the brakes to unlock a skid and then reapply them. Therefore, the overall energy required by the braking system is reduced. This may be important when operating the brakes on an emergency or secondary supply. The brake valve is provided with the energy supply or supplies and uses the energy supply or supplies to operate the brake.

The indication of a brake level may be, for example, a desired brake level, for example a command (current) from a brake pedal in a cockpit or an automatically calculated brake demand from an automatic braking function, or may be the actual brake level of the wheel.

The indication of brake energy supply configuration is an indication of which energy supply the brakes are using. In other words, it is an indication of which energy supply the brake valve is provided with in order to provide brake torque to the wheel brake.

The first brake energy supply may be a primary or "green" supply. The second brake energy supply may be a secondary, backup or "yellow" supply, configured to be connected to the brake valve when the primary supply is not available.

The first brake energy supply may be a secondary, backup or "yellow" supply. The second brake energy supply may be an emergency supply, configured to be connected to the brake valve when the secondary supply is not available.

The backup energy supply/fluid supply may comprise an energy accumulator/hydraulic/pneumatic accumulator/electrical battery with a finite supply available. The accumulator may be located on the yellow energy supply line/hydraulic fluid line.

The primary, secondary and/or emergency supplies may be hydraulic fluid supplies. For example, the emergency supply may comprise a hydraulic accumulator with only a finite amount of hydraulic fluid available.

The control assembly may be present in a single control unit or may be distributed between different control units. For example, the antiskid brake calculator may be in a separate (but connected) unit to the output.

The antiskid brake calculator, or other elements of the control assembly, may itself be present in a single control unit or may be distributed between different control units.

The rise rate is the rate of rise of the (current) command.

The first restriction level may be very high that in effect, no restriction on the current/command is applied. For example, the first restriction level may be a system limitation. In other words, a current/command rise rate above which the aircraft system cannot provide.

The second restriction is a lower level such that the rise rate is generally kept low when using the second energy brake supply. Importantly, the lower rate limitation only applies when the current/command is rising, not lowering so as not to impede the antiskid function (lowering brake torque when a skid is detected).

The invention may be applied to any number of wheels and/or brake systems of the aircraft.

Preferably, the second restriction level may be between 30 and 90% of the first restriction level, preferably between 50 and 80% of the first restriction level, more preferably between 70 and 75% of the first restriction level.

These proportions allow for a significant drop in current/command rise rate that enables a further skid to be prevented.

Preferably, the mode controller is also configured to set a third mode, when the input of the indication of a brake energy supply configuration indicates a third brake energy supply, for example an emergency supply, is being used, in which the antiskid brake calculator applies a third restriction level on a rise rate of the antiskid brake (current) command, the third restriction level being lower than the second restriction level.

Preferably, a restriction level is variable.

The second or third restriction level (or both) may be variable. This allows the restriction rise rate to be adjusted depending on other factors, giving a suitable balance of brake efficiency and those other factors.

More preferably, the control assembly comprises an input of an indication of a level of energy remaining in the brake energy supply and wherein the restriction level is adjusted in dependence on the level of energy remaining.

For example, if using a hydraulic fluid accumulator as the brake energy supply, for example the third brake energy supply, the rise rate can be further limited as the hydraulic fluid depletes. This gives an appropriate balance between brake efficiency and ensuring the hydraulic fluid does not run out, over time.

This may be a continuous indication of a level of energy remaining. Alternatively, or additionally, it might be an indication that the level of energy remaining is within a certain range. Alternatively, or additionally, it might be an indication when the energy level remaining has lowered to within a certain range.

Preferably, the antiskid calculator comprises an antiskid computator, for computating an initial antiskid (current) command, and a restrictor device for receiving the initial antiskid (current) command and then applying a rise rate restriction.

In other words, the restriction is applied after an initial antiskid computation.

Alternatively, or additionally, the restriction may be applied by applying an adjustment to an input into the initial antiskid computation. For example, one or more of the following inputs may be adjusted: change in adherence calculation, factor/adjustment applied to a control speed, or factor/adjustment applied to a speed error.

Preferably, the antiskid brake calculator is configured to apply a specified minimum (current) command level to the antiskid brake (current) command.

This advantageous feature, of the sixth aspect of the invention, may be used in combination with the first aspect. The feature may also be used in combination with the eleventh aspect of the invention.

According to a second aspect of the invention there is also provided an aircraft landing gear comprising the aircraft brake control system as described above and a wheel configured to be controlled in antiskid braking by the aircraft brake control system.

According to a third aspect of the invention there is also provided an aircraft comprising the aircraft brake control system as described above or an aircraft landing gear as described above.

According to a fourth aspect of the invention there is also provided a method of braking an aircraft comprising the step of providing the aircraft brake control system as described above, an aircraft landing gear as described above or an aircraft as described above.

According to a fifth aspect of the invention there is also provided a method of braking an aircraft comprising the steps of noting that a second brake energy supply is being used, calculating an antiskid brake (current) command, and applying a rise rate restriction to the antiskid brake (current) command, the restriction level being lower than if a first brake energy supply was being used.

Preferably, the method further comprises the steps of operating in a first mode in which a first brake energy supply is used and in which an antiskid brake (current) command is rise rate limited by a first restriction level, and switching to a second mode in which a second brake energy supply is used and in which an antiskid brake (current) command is rise rate limited by a second restriction level, lower than the first restriction level.

According to a sixth aspect of the invention there is also provided an aircraft brake control system for controlling antiskid braking of a wheel of an aircraft, the system comprising a control assembly having an input of an indication of the wheel speed of the wheel, an input of an indication of a brake level, an antiskid brake calculator, for calculating an antiskid brake (current) command based on the wheel speed and brake level, wherein the antiskid brake calculator is configured to apply a specified minimum current/command level to the antiskid brake (current) command, and an output for indicating the antiskid brake (current) command to be sent to a brake valve.

Such a system allows for a minimum brake torque to be maintained and so prevent draining of a hydraulic brake piston, for example. This prevent energy loss (e.g. loss of hydraulic fluid) from a brake system. This may be important when operating the brakes on an emergency or secondary supply. The brake valve is provided with the energy supply or supplies and uses the energy supply or supplies to operate the brake.

The indication of a brake level may be, for example, a desired brake level, for example a command (current) from a brake pedal in a cockpit or an automatically calculated brake demand from an automatic braking function, or may be the actual brake level of the wheel.

The specified minimum current/command level may be fixed. For example, the minimum current may be approximately 8 mA.

The antiskid brake current command might otherwise (without the minimum level) vary between 0 and 40 mA.

The specific minimum command level may be between 10 and 30% of the maximum available antiskid brake (current) command. It may be between 15 and 20%.

The control assembly may be present in a single control unit or may be distributed between different control units. For example, the antiskid brake calculator may be in a separate (but connected) unit to the output.

The antiskid brake calculator, or other elements of the control assembly, may itself be present in a single control unit or may be distributed between different control units.

The invention may be applied to any number of wheels and/or brake systems of the aircraft.

Preferably, the specified minimum (current) command level is greater than zero.

Hence, a set amount of hydraulic fluid may be retained in the brake.

This may result in movement of a brake piston of between 10 and 30% of its maximum stroke length, for example only approximately 20% of its maximum stroke length. For example, there may be a maximum stroke length of 10 cm. When the specified minimum (current) command level is applied, this may result in the brake piston position being of 80% of its maximum. In other words, the brake piston is only moved back 20% of its travel length.

More preferably, the specified minimum (current) command level corresponds to a brake pressure at which no braking torque is produced.

The specified minimum (current) command level may be below a "Zero Torque Pressure" (ZTP). The specified minimum (current) command level may be below a "Zero Torque Pressure" (ZTP).

The specified minimum (current) command level may be within 5% (above or below) of the "Zero Torque Pressure" (ZTP).

More preferably, the specified minimum (current) command level corresponds to a maximum brake pressure at which no braking torque is produced.

This is known as a "Zero Torque Pressure" (ZTP) level. In other words, the maximum amount of braking hydraulic fluid can be retained in the brake piston, whilst the piston is producing no braking effect. For example, the brake piston may be only just touching the brake.

Alternatively, the specified minimum (current) command level corresponds to a brake pressure at which less than 5% of the maximum braking torque is produced.

In other words, the (current) command is only slightly above ZTP.

A (current) command level corresponding to ZTP may be 5 to 40, preferably, 10 to 30, more preferably approximately 20% of the maximum command (current) command available. For example, the ZTP current may be 8 mA and the maximum current available may be 40 mA.

Preferably, the aircraft brake control system further comprises an input of an indication of a brake energy supply configuration, a mode controller which sets the mode of operation of the antiskid brake calculator, the mode controller setting a first mode, when the input of the indication of a brake energy supply configuration indicates a first brake energy supply being used, in which the antiskid brake calculator does not apply the specified minimum (current) command level, and a second mode, when the input of the indication of a brake energy supply configuration indicates a second brake energy supply being used, in which the antiskid brake calculator does apply the specified minimum (current) command level.

Hence, the system may control fluid to remain in the brake piston (only) when in a secondary or emergency mode, where an energy supply may be finite.

The indication of brake energy supply configuration is an indication of which energy supply the brakes are using. In other words, it is an indication of which energy supply the brake valve is provided with in order to provide brake torque to the wheel brake.

The first brake energy supply may be a primary or "green" supply. The second brake energy supply may be a secondary, backup or "yellow" supply, configured to be connected to the brake valve when the primary supply is not available.

The first brake energy supply may be a secondary, backup or "yellow" supply. The second brake energy supply may be an emergency supply, configured to be connected to the brake valve when the secondary supply is not available.

The backup energy supply/fluid supply may comprise an energy accumulator/hydraulic/pneumatic accumulator/electrical battery with a finite supply available. The accumulator may be located on the yellow energy supply line/hydraulic fluid line.

The primary, secondary and/or emergency supplies may be hydraulic fluid supplies. For example, the emergency supply may comprise a hydraulic accumulator with only a finite amount of hydraulic fluid available.

Preferably, the antiskid calculator comprises an antiskid computator, for computating an initial antiskid (current) command, and an increase device for receiving the initial antiskid (current) command and then applying a the specified minimum (current) command level.

According to a seventh aspect of the invention there is also provided an aircraft landing gear comprising the aircraft brake control system as described above and a wheel configured to be controlled in antiskid braking by the aircraft brake control system.

According to an eighth aspect of the invention there is also provided an aircraft comprising the aircraft brake control system as described above or an aircraft landing gear as described above.

According to a ninth aspect of the invention there is also provided a method of braking an aircraft comprising the step of providing the aircraft brake control system as described above, an aircraft landing gear as described above or an aircraft as described above.

According to a tenth aspect of the invention there is also provided a method of braking an aircraft comprising the steps of calculating an antiskid brake (current) command, and applying a specified minimum (current) command level to the antiskid brake (current) command.

Preferably, the method further comprises the steps of operating in a first mode in which a first brake energy supply is used, and switching to a second mode in which a second brake energy supply is used and in which an antiskid brake (current) command has the specified minimum (current) command level applied.

According to an eleventh aspect of the invention there is also provided an aircraft brake control system for controlling antiskid braking of a wheel of an aircraft, the system comprising a control assembly having an input of an indication of an aircraft speed, an input of an indication of a wheel speed of the wheel, an input of an indication of a brake level, an input of an indication of a brake energy supply configuration, an optimum slip ratio calculator for calculating an optimum slip ratio of the wheel, based at least partly on the indications of the wheel speed and the aircraft speed, a state determinator for determining a state of the wheel, including a "small skid" state where it is determined that the slip ratio of the wheel is lower than a slip limit above the optimum slip ratio, an antiskid brake calculator, for calculating an antiskid brake (current) command based on the wheel speed, brake level and the determined state, a state mode controller which sets a mode of operation of the state determinator, the state mode controller configured to set a first state determinator mode, when the input of the indication of a brake energy supply configuration indicates a first brake energy supply being used, and in which a first slip limit value is used as the slip limit, and a second state determinator mode, when the input of the indication of a brake energy supply configuration indicates a second brake energy supply being used, in which a second slip limit value is used as the slip limit, the second slip limit value being lower than the first slip limit value, and an output for indicating the antiskid brake (current) command to be sent to a brake valve.

Such a system allows a "small skid" to be determined if the wheel slip is above a certain limit (relative to an optimum slip ratio). However, in particular, the system is able to apply a different (lower) limit when operating in a second, for example, an emergency or secondary energy supply configuration.

This reduces the brake efficiency (because brake torque is released at a lower slip ratio) but is more likely to prevent a more serious or "deep skid" occurring. Hence, it reduces the need to more fully release the brakes to unlock a "deep skid" and then reapply them. Therefore, the overall energy required by the braking system is reduced. This may be important when operating the brakes on an emergency or secondary supply. The brake valve is provided with the energy supply or supplies and uses the energy supply or supplies to operate the brake.

The indication of a brake level may be, for example, a desired brake level, for example a command/current from a brake pedal in a cockpit or an automatically calculated brake demand from an automatic braking function, or may be the actual brake level of the wheel.

The indication of brake energy supply configuration is an indication of which energy supply the brakes are using. In other words, it is an indication of which energy supply the brake valve is provided with in order to provide brake torque to the wheel brake.

The first brake energy supply may be a primary or "green" supply. The second brake energy supply may be a secondary, backup or "yellow" supply, configured to be connected to the brake valve when the primary supply is not available.

The first brake energy supply may be a secondary, backup or "yellow" supply. The second brake energy supply may be an emergency supply, configured to be connected to the brake valve when the secondary supply is not available.

The backup energy supply/fluid supply may comprise an energy accumulator/hydraulic/pneumatic accumulator/electrical battery with a finite supply available. The accumulator may be located on the yellow energy supply line/hydraulic fluid line.

The primary, secondary and/or emergency supplies may be hydraulic fluid supplies. For example, the emergency supply may comprise a hydraulic accumulator with only a finite amount of hydraulic fluid available.

The control assembly may be present in a single control unit or may be distributed between different control units. For example, the antiskid brake calculator may be in a separate (but connected) unit to the output.

The antiskid brake calculator, or other elements of the control assembly, may itself be present in a single control unit or may be distributed between different control units.

The optimum slip ratio is the ratio determined to be optimum ratio of the wheel speed to the expected wheel speed (e.g. based on aircraft speed). At this optimum slip ratio, the value of mu ($\mu$)—coefficient of friction is highest. This depends not only on the wheel and tyre condition but the runway condition (e.g. wet, dry, surface) and other factors. The aircraft brake control system does not work to a set/assumed optimum slip ratio. Instead, it may determine the optimum slip ratio based on various inputs, including wheel speed, and aircraft speed over time. For example, the various inputs may include a reference speed.

At the optimum slip ratio, the brakes are performing well and the wheel is not skidding. As the slip ratio increases, the chance of skidding is increased. Hence, normally a brake system may aim to operate within, say 10% of the optimum slip ratio. In other words, the braking command sent to the wheel or wheels would be reduced (so as to unlock a wheel that was skidding or about to skid) if the slip ratio was more than 10% of the optimum slip ratio. Hence, as an example, the first slip limit may be 10% higher than the optimum slip ratio.

However, in a situation where an emergency braking energy supply was being used, the brake system may aim to operate within, say 5% of the optimum slip ratio. In other words, the braking command sent to the wheel or wheels would be reduced if the slip ratio was more than 5% of the optimum slip ratio. Hence, as an example, the second slip limit may be 5% higher than the optimum slip ratio.

The braking command sent to the wheel or wheels may be reduced (in the "small skid" state) by 10 to 35% of the maximum braking command. For example, a maximum braking command may correspond to 175 bar of brake pressure. A "small skid" state may involve a reduction in brake pressure of 20 to 60 bar (i.e. down to 115 to 155 bar). Such a brake pressure reduction would have a small reduction in brake pressure but a negligible amount of brake hydraulic fluid loss (due to the brake piston being relatively stiff and so a small volume change giving rise to a large pressure change).

The antiskid brake calculator may calculate the antiskid brake (current) command so as to reduce the slip ratio to be lower than the slip limit. In other words, the antiskid braking is designed to maintain the slip ratio within a set amount (set limit) of the optimum slip ratio.

The invention may be applied to any number of wheels and/or brake systems of the aircraft.

Preferably, the first slip limit is between 5 and 15% higher than the optimum slip ratio.

It may be between 8 and 12% higher than the optimum slip ratio. It may be approximately 10% higher than the optimum slip ratio.

Preferably, the second slip limit is between 1 and 7% higher than the optimum slip ratio.

It may be 4 to 6% higher than the optimum slip ratio. It may be approximately 5% higher than the optimum slip ratio.

Preferably, the first slip limit is between 1 and 15% higher than the second slip limit.

It may be between 3 and 6% higher than the second slip limit.

Preferably, the state determinator for determining a state of the wheel, includes a "deep skid" state where it is determined that the wheel speed is lower than a first speed limit below an expected wheel speed.

For example, the expected speed limit may be 50% of the expected wheel speed. If wheel speed is lower than this—for example close to zero—it is determined that the wheel is in a "deep skid" state.

The braking command sent to the wheel or wheels may be reduced (in the "deep skid" state) by 90 to 100% of the maximum braking command. For example, a maximum braking command may correspond to 175 bar of brake pressure. A "deep skid" state may involve a reduction in brake pressure of 158 to the full 175 bar (i.e. to between 0 bar and 17 bar).

This may involve a substantially full draining of a brake piston.

Alternatively, in combination with the sixth aspect, the antiskid brake calculator may be configured to apply a specified minimum (current) command level to the antiskid brake (current) command.

Preferably, the control assembly comprises a mode controller which sets the mode of operation of the antiskid brake calculator, the mode controller configured to set a first mode, when the input of the indication of a brake energy supply configuration indicates a first brake energy supply being used, in which the antiskid brake calculator applies a first restriction level on a rise rate of the antiskid brake (current) command, and a second mode, when the input of the indication of a brake energy supply configuration indicates a second brake energy supply being used, in which the antiskid brake calculator applies a second restriction level on a rise rate of the antiskid brake (current) command, the second restriction level being lower than the first restriction level.

This advantageous feature, of the first aspect of the invention, may be used in combination with the sixth aspect. The feature may also be used in combination with the eleventh aspect of the invention.

The mode controller and the state mode controller may be the same device.

According to a twelfth aspect of the invention there is also provided an aircraft landing gear comprising the aircraft brake control system as described above and a wheel configured to be controlled in antiskid braking by the aircraft brake control system.

According to a thirteenth aspect of the invention there is also provided an aircraft comprising the aircraft brake control system as described above or an aircraft landing gear as described above.

According to a fourteenth aspect of the invention there is also provided a method of braking an aircraft comprising the step of providing the aircraft brake control system as described above, an aircraft landing gear as described above or an aircraft as described above.

According to a fifteenth aspect of the invention there is also provided a method of braking an aircraft comprising the steps of at a first time noting that a first brake energy supply is being used, and assessing if a wheel is in a "small skid" state by applying a first slip limit to the wheel, and, at a second time noting that a second brake energy supply is being used, and assessing if a wheel is in a "small skid" state by applying a second slip limit to the wheel, the second slip limit being lower than the first slip limit.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
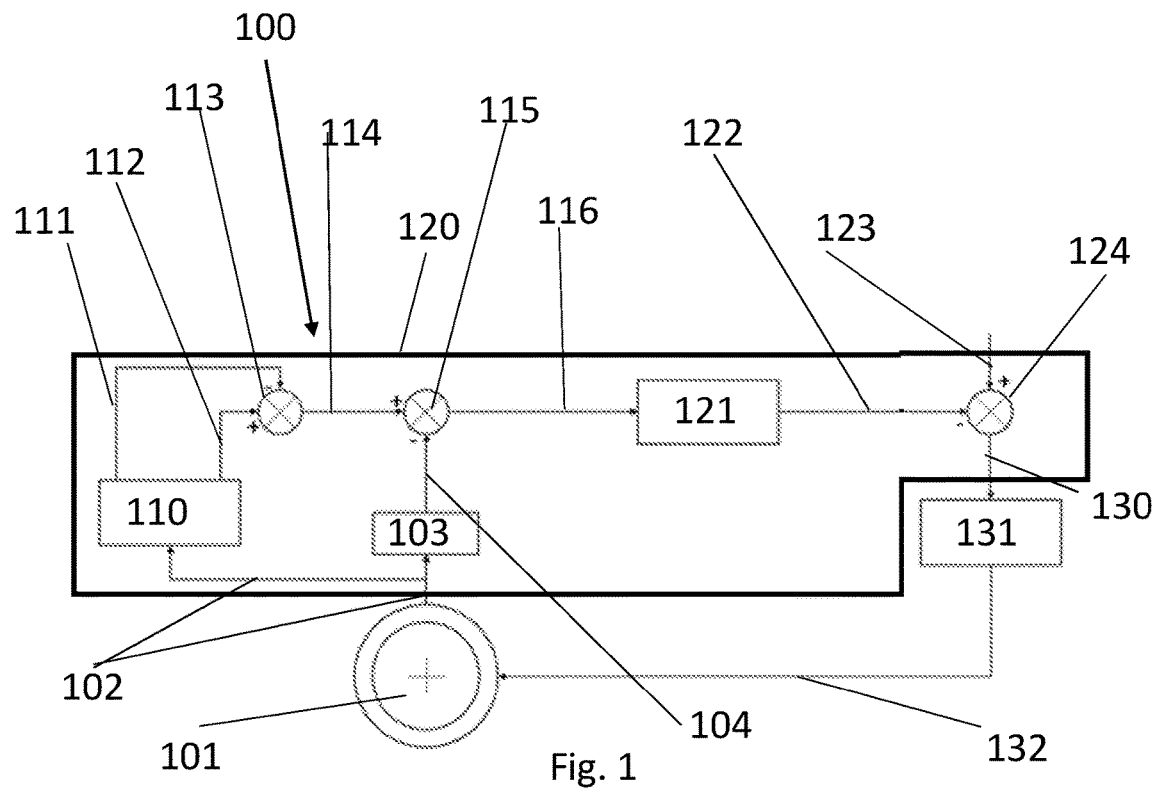
FIG. 1 shows a schematic view of an aircraft brake control system, according to the prior art.

FIG. 1 shows a schematic view of an aircraft brake control system, according to the prior art.

The control system includes a control assembly 100. The assembly 100 comprises various elements all denoted as being part of an antiskid calculator 120.

Figure 9:
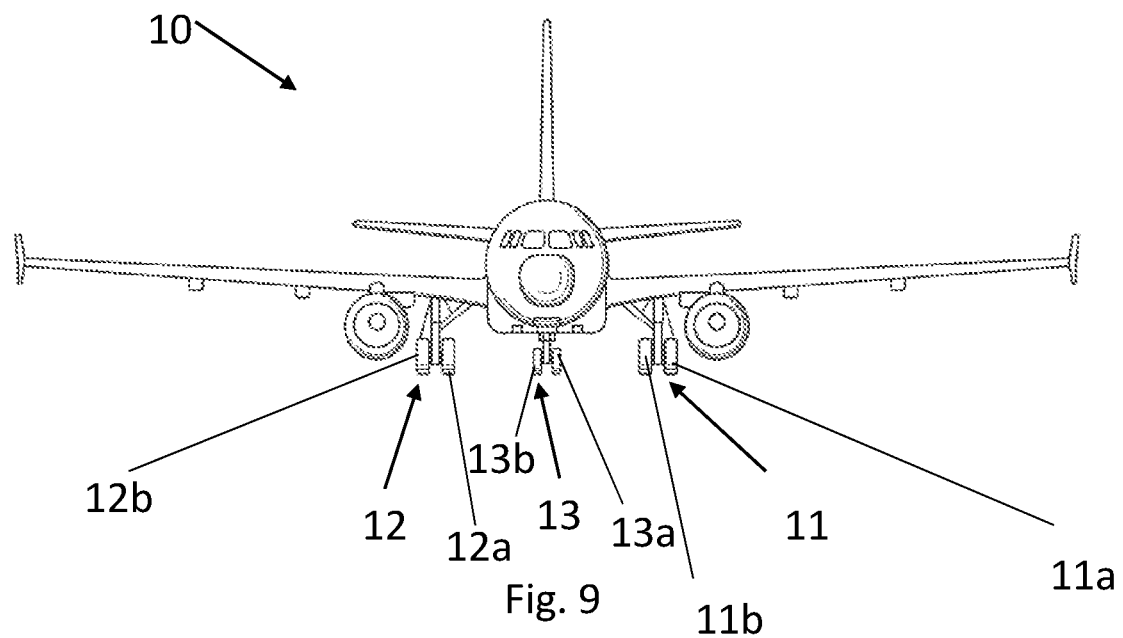
FIG. 9 shows front view of an aircraft suitable for including an aircraft brake control system according to any of the above embodiments.

The antiskid calculator 120 has an input of a wheel speed 102 from a wheel 101 (for example, wheel 11a in FIG. 9). The antiskid calculator 120 has an output of a brake servo valve command current 130, which is fed to a brake servo valve 131. The valve 131 uses the current sent to it to apply a corresponding amount of brake pressure 132 to the wheel 101. The brake pressure 132 is supplied from a brake energy supply (not shown), which is a hydraulic supply, either coming from a normal "green" supply, or if that is not available a backup "yellow" supply, or if that is not available, an emergency "accumulator" supply.

Now, looking in more detail at the antiskid calculator 120.

The wheel speed input 102 is branched into two, with a first branch including a wheel speed low pass filter 103 to provide an output of a filtered wheel speed 104 (with noise removed from the wheel speed signal 102). The second branch is sent to an optimum controller 110, which uses the wheel speed 102 (plus other factors, for example taking into consideration possible wheel tachometer failures, and aircraft speed, not shown) to output an adherence value 111 and a reference speed 112. The adherence 111 is adjusted by the optimum controller 110 in order to vary an optimum slip based on various factors such as runway surface condition, brake gain etc. It represents the level of allowable slip. The reference speed 112 is a function of the speed of all aircraft wheels and represents the overall aircraft speed. The adherence 111 is subtracted from the reference speed at summation point 113 and outputs a desired control speed 114.

The filtered wheel speed 104 is subtracted from the control speed 114 at summation point 115 and a speed error 116 is output. This speed error 116 is provided to an antiskid filter 121, which calculates how much pressure (and therefore how much current) is needed to be removed from the brake based on the speed error 116. The antiskid filter 121 then outputs an antiskid current 122 (the current to be removed from the command current).

This antiskid current 122 is therefore subtracted from the commanded brake current 123 (e.g. from a brake pedal in a cockpit) at summation point 124, and output as the brake servo valve command current 130.

Hence, when there is a large discrepancy between the wheel speed (filtered to remove spurious readings, noise etc.) and the control speed (relating to the aircraft speed), the antiskid filter ensures there is a reduction in the current command 130 sent to the brake servo valve 131. Hence, when the wheel speed is low and it looks like a skid is occurring or might be about to occur, the brake pressure is released to release the skidding wheel.

Importantly, the calculations of the optimum calculator 110 take into account the various conditions (for example, of the runway) and is able to assess a state of the wheel.

Figure 2:
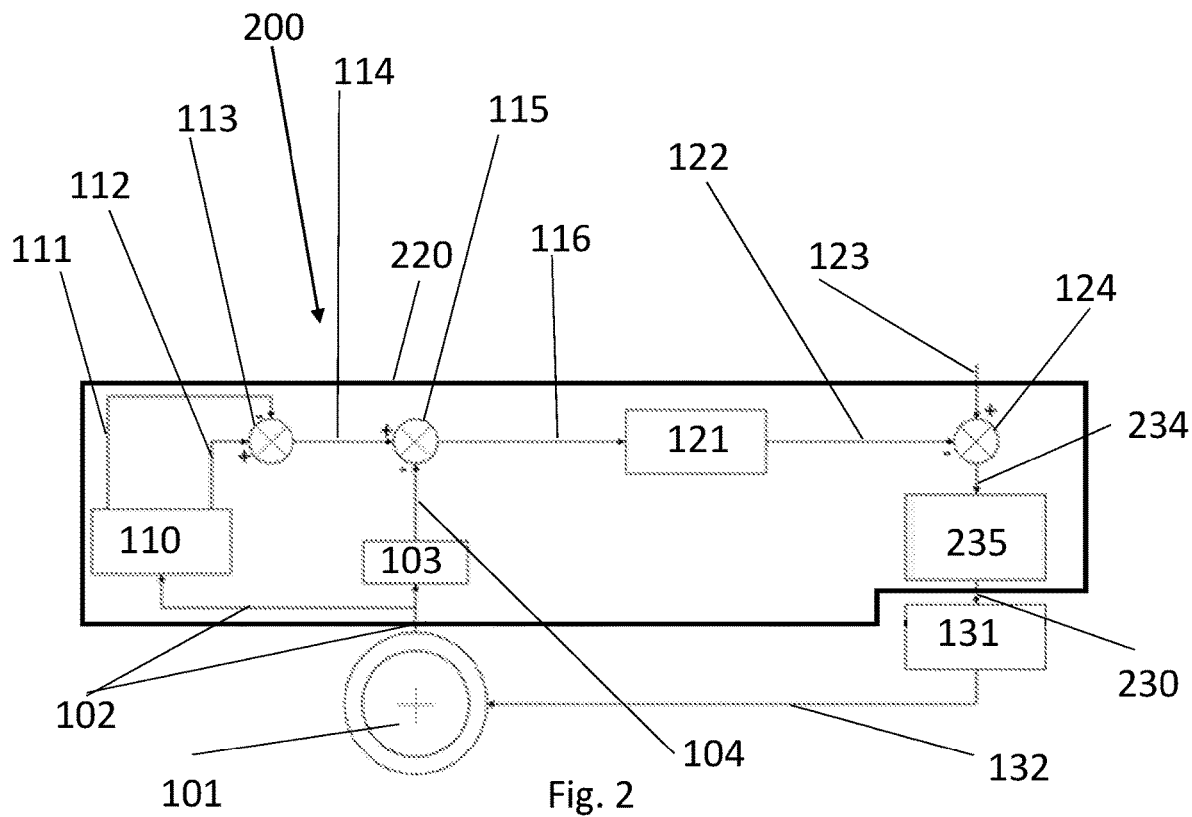
FIG. 2 shows an equivalent schematic view of an aircraft brake control system, according to a first embodiment of the invention.

FIG. 2 shows an equivalent schematic view of an aircraft brake control system, according to a first embodiment of the invention.

In the description below, where like elements already described are present, the same reference numerals as previously will be used. New or significantly adapted elements will be denoted by a reference numeral starting with a "2".

The control system includes a control assembly 200. The assembly 200 comprises various elements all denoted as being part of an antiskid calculator 220. The elements are the same as for antiskid calculator 120 but with an extra element.

This extra element is a current rise rate restrictor 235. This receives an output 234 from the summation point 124. This output 234 is the same as the current 130 that would have been sent to the brake servo valve 131 in the first embodiment. However, here a rise rate restriction is applied (by a rise rate restrictor 235) to that current 130/234 and the "rise rate restriction" current 230 is instead the current supplied to the brake servo valve 131.

The current rise rate restrictor 235 restricts the rise in current exceeding 70% of the maximum current rise rate of the system.

Hence, this prevents overly aggressive reapplication of brake pressure after an antiskid event. This reduces the possibility of inducing another skid. Hence, brake energy supply (hydraulic fluid) is conserved.

Figure 3:
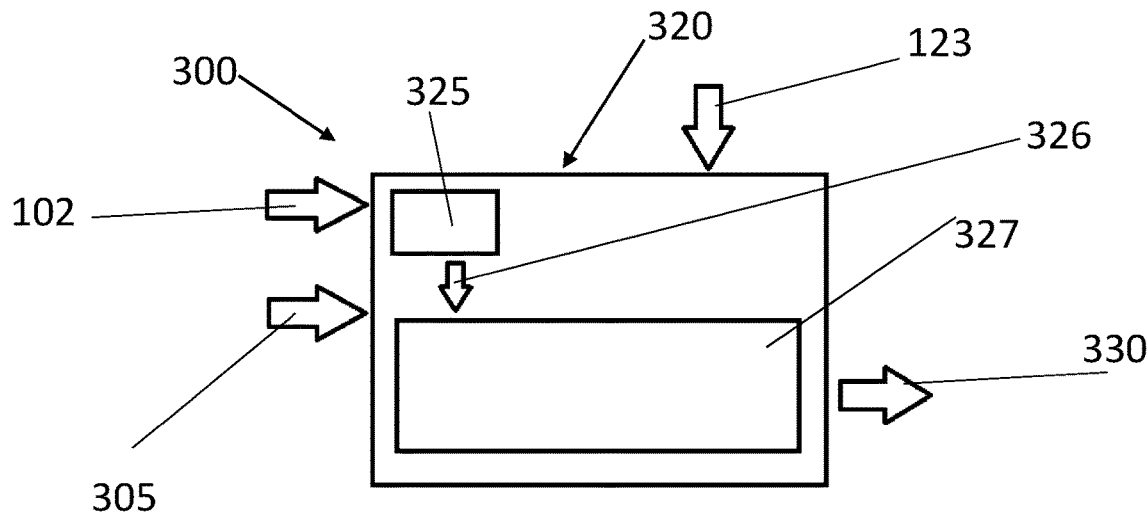
FIG. 3 shows a simplified schematic view of an aircraft brake control system, according to a second embodiment of the invention.

FIG. 3 shows a simplified schematic view of an aircraft brake control system, according to a second embodiment of the invention.

In the description below, where like elements already described are present, the same reference numerals as previously will be used. New or significantly adapted elements will be denoted by a reference numeral starting with a "3".

The control system includes a control assembly 300. The assembly 300 comprises various elements all denoted as being part of an antiskid calculator 320.

The assembly has an input 305 indicating the hydraulic supply being used. This will indicate if an emergency hydraulic supply is being used.

The elements of the antiskid calculator 320 are the similar as for antiskid calculator 220. Element 325 represents an initial antiskid calculator, equivalent to antiskid calculator 120 in the prior art. This outputs an initial antiskid current 326. The current rise rate restrictor 235 of the first embodiment is effectively replaced with a mode controller 327. The mode controller 327 applies the same current rate rise limitation as 235 so that the brake servo valve command current 330 is limited in the rate at which it can rise. However, the mode controller 327 only applies this rate restriction when the input 305 indicates that the emergency brake supply is being used. Otherwise, no rate restriction is applied.

Figure 4:
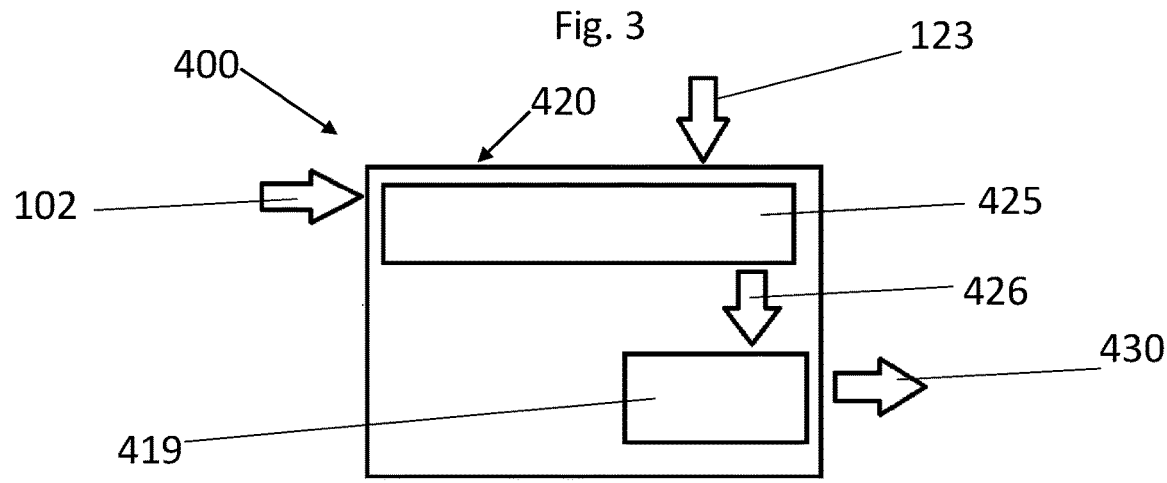
FIG. 4 shows a simplified schematic view of an aircraft brake control system, according to a third embodiment of the invention.

FIG. 4 shows a simplified schematic view of an aircraft brake control system, according to a third embodiment of the invention.

In the description below, where like elements already described are present, the same reference numerals as previously will be used. New or significantly adapted elements will be denoted by a reference numeral starting with a "4".

The control system includes a control assembly 400. The assembly 400 comprises various elements all denoted as being part of an antiskid calculator 420.

Element 425 represents an initial antiskid calculator, equivalent to antiskid calculator 120 in the prior art. This outputs an initial antiskid current 426. A current increase device 419 then applies a minimum current (of 8 mA, 20% of the maximum current available of 40 mA) to the output 426 such that the output of brake servo valve command current 430 has a minimum value.

At the minimum current of 8 mA, the brake piston moves approximately 20% of its maximum stroke length. Here, it moves from its maximum stroke length of 10 cm, back by 2 cm to a length of 8 cm.

That current value and piston movement corresponds to a brake pressure of "zero torque pressure" ("ZTP"). In other words, the brake piston is just touching the brake and applies zero torque to the brakes.

Figure 6:
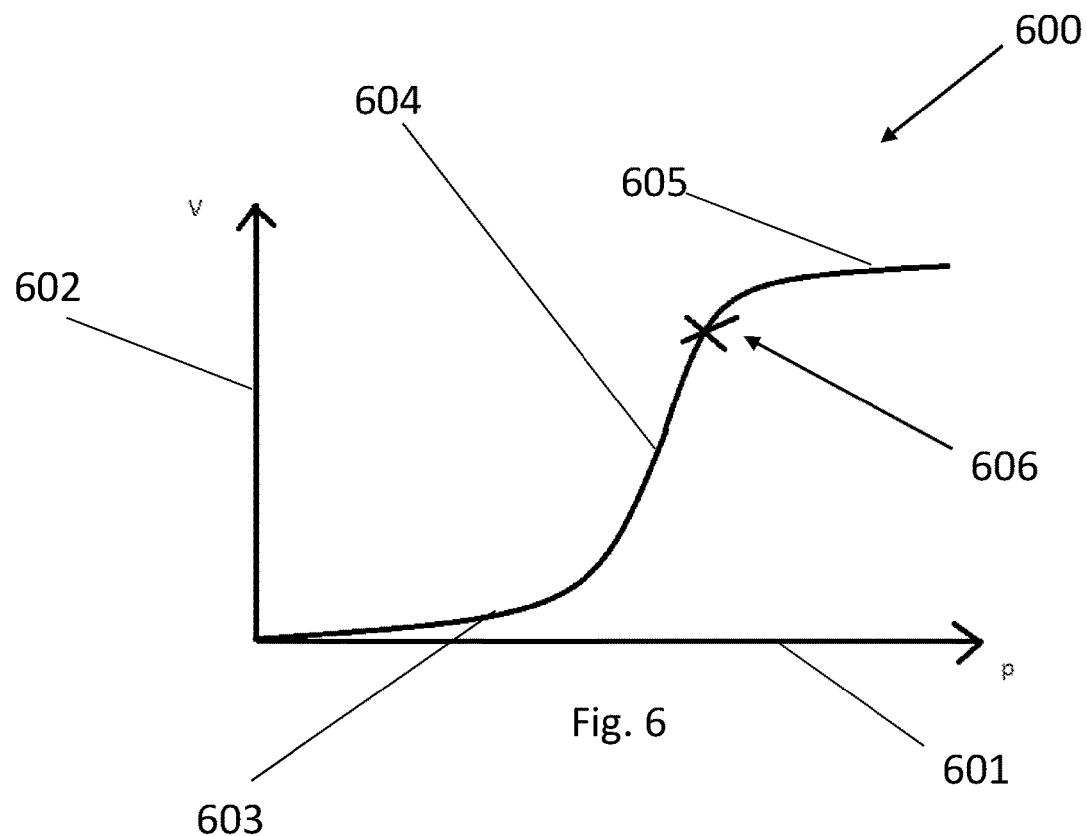
FIG. 6 shows a graph illustrating a "ZTP" value, used in the embodiment of FIG. 5.

This is illustrated by the graph 600 of FIG. 6.

The graph 600 sows how the volume of fluid in the brake piston (y axis) 602 varies with the pressure in the brake piston (x axis) 601. It can be seen that at low brake piston pressures, the volume in the piston remains low (region 603) but then ramps up steadily (region 604). It than plateaus (region 605) as increased brake piston pressure results in minimal volume change. Cross 606 represents the "ZTP" pressure value. Here, there is no actual pressure applied by the piston to the brakes, as the piston has moved away from the wheel. However, the piston has only moved very slightly away and so the volume decrease (from region 605) is negligible. Hence, this minimises the brake fluid loss from the system.

Figure 5:
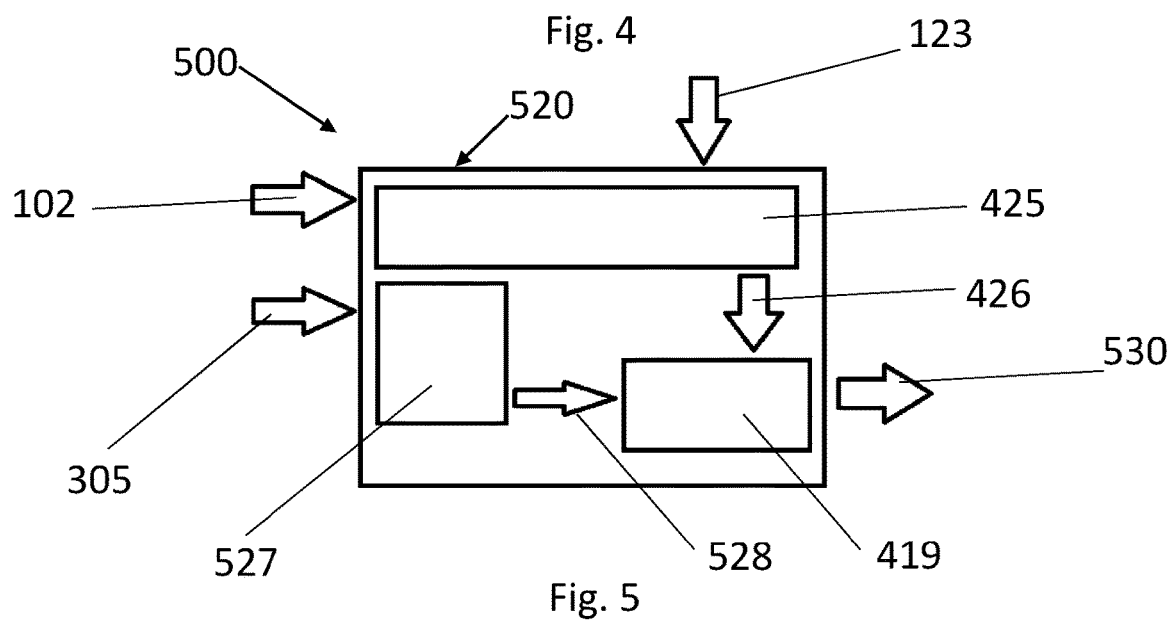
FIG. 5 shows a simplified schematic view of an aircraft brake control system, according to a fourth embodiment of the invention.

FIG. 5 shows a simplified schematic view of an aircraft brake control system, according to a fourth embodiment of the invention.

In the description below, where like elements already described are present, the same reference numerals as previously will be used. New or significantly adapted elements will be denoted by a reference numeral starting with a "5".

The control system includes a control assembly 500. The assembly 500 comprises various elements all denoted as being part of an antiskid calculator 520.

Element 425 represents an initial antiskid calculator, equivalent to antiskid calculator 120 in the prior art. This outputs an initial antiskid current 426. A current increase device 419 then applies a minimum current to the output 426 such that the output of brake servo valve command current 530 has a minimum value. This is similar to that of FIG. 4.

However, the current increase device 419 only applies the minimum current value when input 305 indicates to a mode controller 527 that an emergency brake supply is being used.

The mode controller 527 sends a signal 528 to the current increase device 419 that lets it know whether or not to apply the minimum current level.

Figure 7:
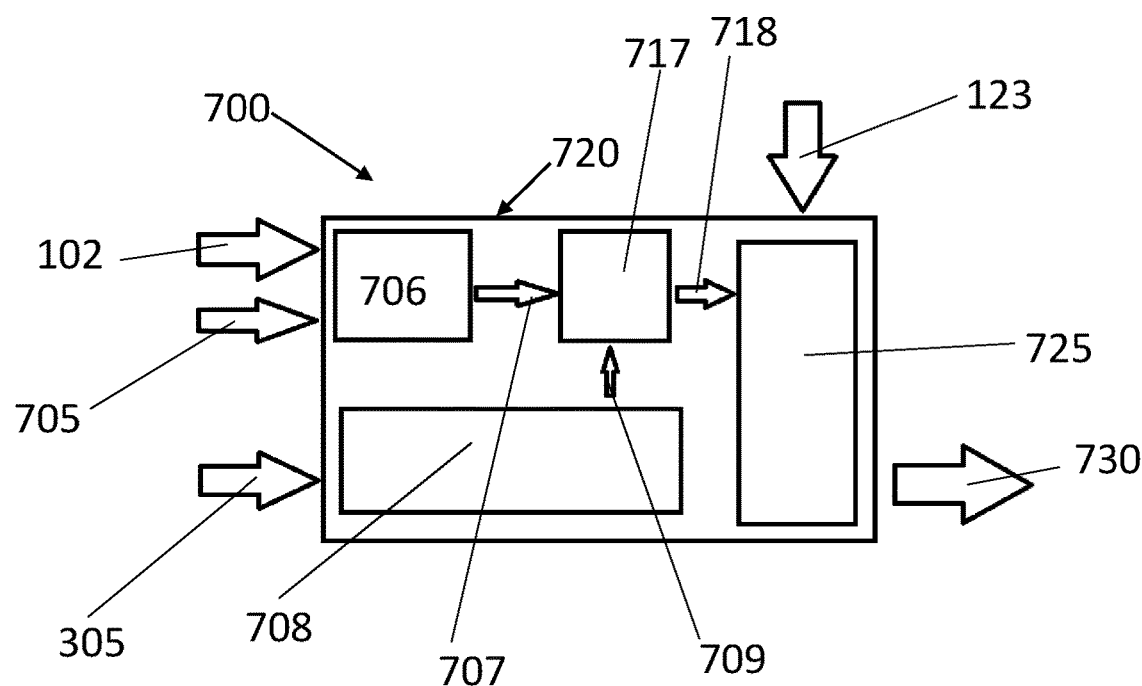
FIG. 7 shows a simplified schematic view of an aircraft brake control system, according to a fifth embodiment of the invention.

FIG. 7 shows a simplified schematic view of an aircraft brake control system, according to a fifth embodiment of the invention.

In the description below, where like elements already described are present, the same reference numerals as previously will be used. New or significantly adapted elements will be denoted by a reference numeral starting with a "7".

The control system includes a control assembly 700. The assembly 700 comprises various elements all denoted as being part of an antiskid calculator 720.

Element 725 represents a primary antiskid calculator, equivalent/similar to antiskid filter 121 in the prior art.

Input 705 to the assembly 700 indicates an aircraft speed. An optimum slip ratio calculator 706 then uses the aircraft speed 705, wheel speed 102 and other factors to calculate an optimum slip ratio, output as 707. This is output to a state determinator 717.

The state determinator also receives a state mode 709 from a state mode determinator 708. The state mode determinator 708 determines the mode the state determinator 717 should work in and it does this based on the input 305 of braking supply being used. Hence, if the input 305 indicates that an emergency braking supply is being used, the state mode determinator specifies (by output 709) to the state determinator 717 to apply a certain determination procedure. In this case, it specifies that for a "small skid" to be determined, the wheel speed must be within 5% above the optimum slip ratio speed. Otherwise, the state determinator would determine a "small skid" when the wheel speed is within 10% above the optimum slip ratio speed.

The state determinator 717 also determines other states of the wheel, such as a "deep skid", which is determined if the wheel speed 102 is under 50% of the expected wheel speed (based on the aircraft speed and other factors). There are a further seven states, which will not be described here.

The state determinator 717 outputs 718 the determined state of the wheel 101 and the anti-skid calculator 425 can calculate the appropriate antiskid current (or brake servo valve command current 730) based on that determination (and wheel speed 102 etc.).

For example, when a "small skid" is determined, the antiskid calculator 725 calculates a current 730 to reduce the brake pressure slightly so as to release the skid. Here, the brake pressure may be released by 20 to 60 bar (from a maximum brake pressure of 175 bar).

When a "deep skid" is determined, the antiskid calculator 725 calculates a current 730 to fully (or to ZTP level) reduce the brake pressure. Here, it moves the brake piston by 5 cm (half its maximum travel length).

Figure 8:
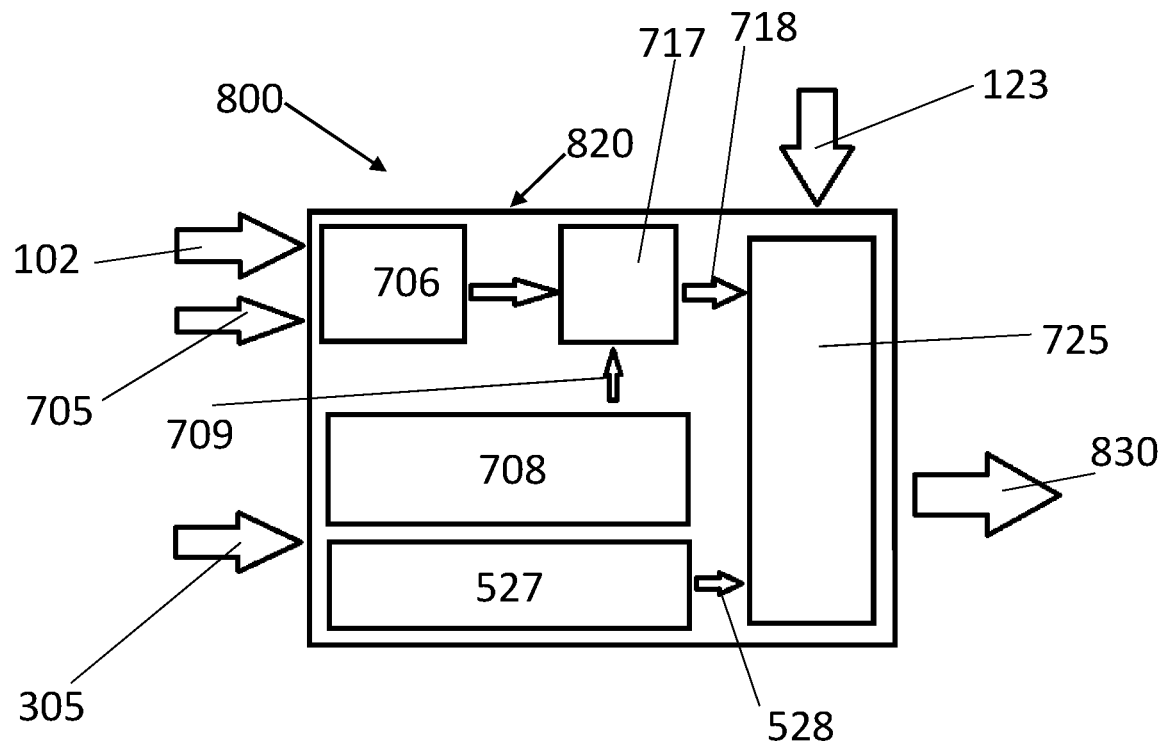
FIG. 8 shows a simplified schematic view of an aircraft brake control system, according to a sixth embodiment of the invention.

FIG. 8 shows a simplified schematic view of an aircraft brake control system, according to a sixth embodiment of the invention.

In the description below, where like elements already described are present, the same reference numerals as previously will be used. New or significantly adapted elements will be denoted by a reference numeral starting with a "8".

The control system includes a control assembly 800. The assembly 800 comprises various elements all denoted as being part of an antiskid calculator 820.

It is very similar to the antiskid calculator 720 of FIG. 7. However, it also includes a mode controller 527, like that of FIG. 5. This mode controller 527 includes an output 528 indicating to the primary antiskid calculator 725 if the emergency braking supply is being used. Hence, the primary antiskid calculator 725 applies the current rise rate restriction if emergency braking is being used.

FIG. 9 shows front view of an aircraft 10 suitable for including an aircraft brake control system according to any of the above embodiments.

The aircraft 10 has a nose landing gear 13, with wheels 13a and 13b, left main landing gear 11, with wheels 11a and 11b and right main landing gear, with wheels 12a and 12b. The control systems and assemblies described may be applied to any wheel or set of wheels on this aircraft 10.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the above examples, the brake servo valve is controlled by a current command. However, any suitable brake servo valve and any suitable control method/command could be used.

For example, the valve may be mechanically controlled. For example, using one or more hydraulic components, such as a hydraulic restrictor to control the pressure rise rate.

As a further example, an electric motor could be used as an actuator, and the position of the actuator could be commanded with a current, where the current would go through a Wheatstone bridge to operate the motor.

Any suitable rise rate restriction value may be used.

The supply input 305 may indicate when a backup supply is being used. A current rise rate restriction may be applied when this supply is being used.

There may be a different (higher) current rise rate restriction applied when the when the supply input 305 indicates that the brake supply is not the emergency (or backup) supply (for example, the normal supply). For example, this may be there simply to reduce oscillations in the system and reduce tyre damage.

There may be a different (lower) current rise rate restriction applied when the supply input 305 indicates that the brake supply is the emergency supply.

The rise rate restriction 235 may be applied at any suitable part/step in the control assembly. For example, the adherence 111 rise rate could be limited by the optimum controller 110, which in turn limits the rise rate of the control speed 114 and speed error 116. It could be applied as a rise rate restriction on the control speed 114 or speed error 116. It could be applied as a rise rate restriction by the antiskid filter 121 and/or on the antiskid current 122.

The supply input 305 may include an indication of the actual amount of energy (hydraulic fluid) left in the accumulator/emergency supply. The rise rate restriction may vary depending on the amount left, the restriction level getting lower as the supply runs out.

The minimum current/command 419 may be applied at any suitable part/step in the control assembly. For example, it may be made as part of the antiskid filter 121 and/or on the antiskid current 122.

The change in the level of allowable slip may be applied at any suitable part/step in the control assembly. For example, it may be made as part of the adherence 111 calculation.

Any suitable percentages relative to optimum slip ratio may be used.

The state determinator may have other states, in addition to "small skid" and/or "deep skid".

Any elements may be combined with other elements. For example, a current/command increase device 419 may be included in the control assembly of FIG. 7 or 8. For example, effectively applied in between primary antiskid calculator 725 and output 730/830.

Instead of using an indication of a desired brake level (i.e. a command pressure/torque/force), the actual brake level of the wheel may be used.

The control systems and assemblies described may be applied to any wheel or set of wheels on any aircraft.

The brake energy supply may be an electrical supply, or pneumatic supply.

The various restrictions/limits could be applied for any suitable selection of the available braking configurations (braking supplies being used). For example, some or all of the restrictions described may be applied only when in emergency braking mode, in emergency and backup modes, or in all three modes.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

Although the invention has been described above mainly in the context of a fixed-wing aircraft application, it may also be advantageously applied to various other applications, including but not limited to applications on vehicles such as helicopters, drones, trains, automobiles and spacecraft.

The invention claimed is:

1. An aircraft brake control system for controlling antiskid braking of a wheel of an aircraft, the system comprising a control assembly having:
   i) an input of an indication of a wheel speed of the wheel,
   ii) an input of an indication of a brake level,
   iii) an input of an indication of a brake energy supply configuration,
   iv) an antiskid brake calculator, for calculating an antiskid brake command based on the wheel speed and brake level,
   v) a mode controller which sets the mode of operation of the antiskid brake calculator, the mode controller configured to set:
      a first mode, when the input of the indication of a brake energy supply configuration indicates a first brake energy supply being used, in which the antiskid brake calculator applies a first restriction level on a rise rate of the antiskid brake command, and
      a second mode, when the input of the indication of a brake energy supply configuration indicates a second brake energy supply being used, in which the antiskid brake calculator applies a second restriction level on a rise rate of the antiskid brake command, the second restriction level being lower than the first restriction level, and
   vi) an output for indicating the antiskid brake command to be sent to a brake valve:
      wherein the antiskid calculator comprises an antiskid computator, for computing an initial antiskid command, and a restrictor device for receiving the initial antiskid command and then applying a rise rate restriction.

2. An aircraft brake control system as claimed in claim 1, wherein:
   the second restriction level may be between 30 and 90% of the first restriction level; and/or
   the mode controller is also configured to set a third mode, when the input of the indication of a brake energy supply configuration indicates a third brake energy supply being used, in which the antiskid brake calculator applies a third restriction level on a rise rate of the antiskid brake command, the third restriction level being lower than the second restriction level; and/or
   a restriction level is variable, wherein optionally the control assembly comprises an input of an indication of a level of energy remaining in the brake energy supply and the restriction level is adjusted in dependence on the level of energy remaining; and/or
   the antiskid brake calculator is configured to apply a specified minimum command level to the antiskid brake command.

3. An aircraft landing gear comprising the aircraft brake control system as claimed in claim 1 and a wheel configured to be controlled in antiskid braking by the aircraft brake control system.

4. An aircraft comprising the aircraft brake control system as claimed in claim 1.

5. A method of braking an aircraft comprising the step of providing the aircraft brake control system as claimed in claim 1.

6. A method of braking an aircraft comprising the steps of:
   noting that a second brake energy supply is being used,
   calculating an antiskid brake command, and
   applying a rise rate restriction to the antiskid brake command, the restriction level being lower than if a first brake energy supply was being used,
wherein the restriction is applied after an initial antiskid computation.

7. A method of braking an aircraft as claimed in claim 6, further comprising the steps of:
   operating in a first mode in which a first brake energy supply is used and in which an antiskid brake command is rise rate limited by a first restriction level, and
   switching to a second mode in which a second brake energy supply is used and in which an antiskid brake command is rise rate limited by a second restriction level, lower than the first restriction level.

* * * * *